No. 853,929. PATENTED MAY 14, 1907.
W. W. MASSIE.
WIRELESS TELEGRAPHY.
APPLICATION FILED NOV. 4, 1905.
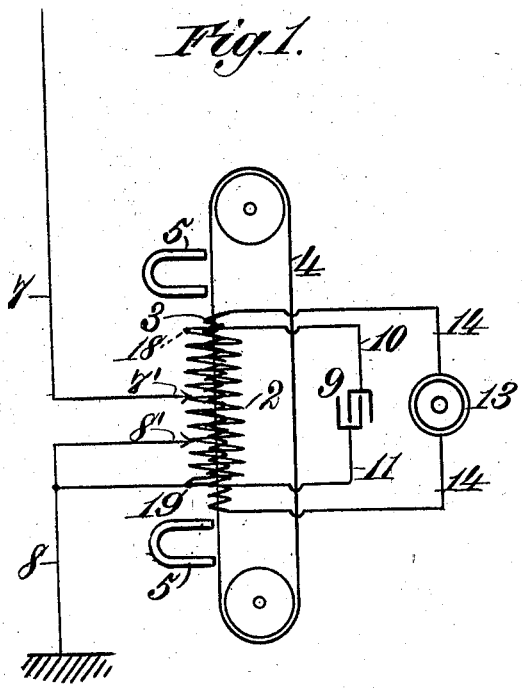
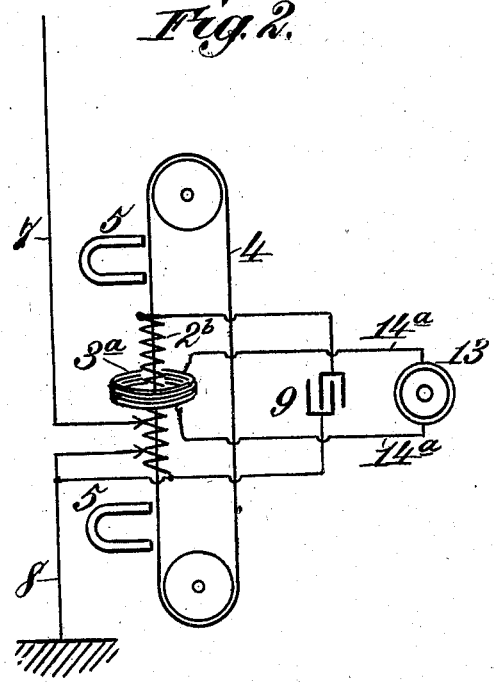
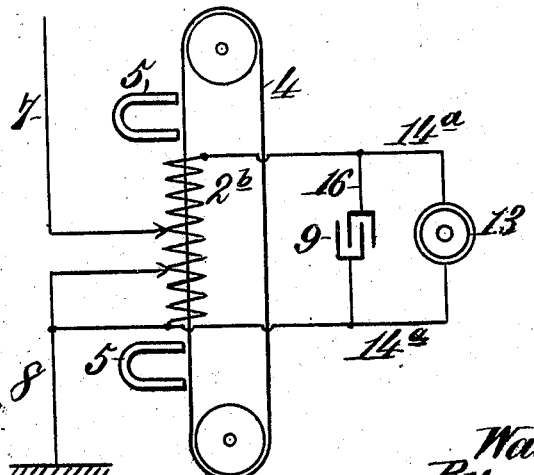
Witnesses.
Inventor:
Walter W. Massie.
By James L. Norris.
Atty.

UNITED STATES PATENT OFFICE.

WALTER W. MASSIE, OF PROVIDENCE, RHODE ISLAND.

WIRELESS TELEGRAPHY.

No. 853,929.　　　　Specification of Letters Patent.　　　　Patented May 14, 1907.

Application filed November 4, 1905. Serial No. 285,890.

*To all whom it may concern:*

Be it known that I, WALTER W. MASSIE, a citizen of the United States, residing at Providence, in the county of Providence and State of Rhode Island, have invented new and useful Improvements in Wireless Telegraphy, of which the following is a specification.

This invention relates to wireless telegraphy, one of the principal features of the invention being in a wave-frequency oscillatory receiving circuit of a novel character, by which certain improved results are obtained. One of these results is sharp, accurate tuning; another is the amplification or building up weak signals that ordinarily are destroyed and lost. In the present case the closed oscillatory circuit has inductance, capacity and resistance and it is essential that the resistance be constant as contradistinguished from a variable resistance such as that presented by a coherer or a responder.

I find that I can secure the best possible results by providing a closed oscillatory circuit having resistance, capacity and inductance, each constant, by virtue of which I can secure accurate tuning and amplification of signals in the receiving circuit, which signals may be readily detected in a suitable instrument, such as a telephone receiver.

When I state that the three factors in question are constant, I do not mean to indicate that adjustment cannot be obtained, for I provide means for adjusting to the various wave lengths.

In the drawings, Figures 1, 2 and 3 are diagrams showing several of the many ways in which my invention can be advantageously put into practical use.

In Fig. 1 of the drawings, I have represented a magnetic detector of familiar kind, said detector in the present case having primary and secondary coils, as 2 and 3, respectively. The core for the detector is designated by 4 and it is represented as consisting of an endless iron band or cable with which are represented associated magnets, as 5, of the permanent horse shoe type. I have described briefly a well-known form of magnetic detector which acts in the customary manner, the cable or band 4 being moved in any desirable way.

The vertical and ground connections are denoted by 7 and 8, respectively, and their inner terminals are associated in an adjustable manner, as at 7' and 8' with the primary 2. This result can be accomplished by baring the primary of insulation longitudinally thereof. By adjusting the vertical and ground connections relatively to the primary 2, I can vary resistance and inductance by throwing in or cutting out helices of the primary 2.

A condenser is shown at 9 connected by conductor, as 10, with the primary 2 at 18, and by conductor 11 with primary 2 at 8' and 19, respectively, the closed oscillatory circuit shown in Fig. 1 comprising the condenser 9, the conductors 10 and 11 and the primary 2 between the points 18 and 8'.

The contacts 7' and 8' are adjusted to harmonize the oscillations of the vertical system and the closed circuit with the oscillations of the received signals. The condenser 9 is made adjustable to increase range of the closed circuit.

I provide for the adjustment of the three factors inductance, capacity and resistance as will be understood from the described relation of parts but when once the adjustment is made, it is maintained unless it be desired to adapt the instrument to oscillations of a different period, when adjustments are made.

When adjusted oscillations are set up in the vertical 7, primary 2, between the points 7' and 8' and ground 8, corresponding oscillations are set up in the closed circuit described and as the three factors described as possessed by the receiving circuit are constant, the oscillations in said receiving circuit will be in harmony at all times with those set up in the vertical 7, primary 2, between the points 7' and 8', and ground 8. Thus weak signals are amplified or built up while on the other hand, when a coherer or responder is used, the extreme variation in its resistance changes the period of oscillation thus destroying the signals.

A telephone receiver is represented at 13 and as connected with the secondary 3 by conductors 14. Any signal received in the closed oscillatory circuit can be very readily detected by the telephone receiver 13.

When I use the expression "telephone receiver" I do so in a broad sense to include analogous apparatus whereby intelligence may be received from a distant point.

The only difference in the system shown in Fig. 2 from that shown in Fig. 1 is in the character of secondary 3ª. The secondary 3ª consists of a shallow coil surrounding the primary 2 and movable longitudinally of the latter. In Fig. 3 I show the vertical and ground connections 7 and 8 respectively as connected with a single coil $2^b$, a telephone, as 13, being connected by conductors, as $14^a$, with the opposite ends of the coil $2^b$. Bridging the conductors $14^a$ between the telephone 13 and the coil $2^b$ is a conductor, as 16, intersected by a condenser as 9, whereby the condenser forms part of a closed oscillatory receiving circuit including the coil $2^b$. I have designated similar parts in the three diagrams by like characters.

What I claim is:

1. In wireless telegraphy, a wave-frequency oscillatory-receiving circuit including a magnetic-detector coil and capacity, said coil constituting inductance for said circuit and being together with the capacity, adjustable for tuning said circuit.

2. In wireless telegraphy, a closed wave-frequency oscillatory circuit including a magnetic-detector coil and capacity, said coil constituting inductance for the circuit and being with the capacity adjustable for tuning said circuit.

3. In wireless telegraphy, a closed wave-frequency oscillatory receiving circuit including the coil of a magnetic-detector, which coil constitutes the inductance of said circuit, the latter also including capacity, and vertical and ground connections adjustably connected with the coil to vary the inductance, and the capacity being also adjustable, said adjustments being for the purpose of tuning said circuit.

4. In wireless telegraphy, two oscillatory circuits, one of which is open and the other closed and all wave-frequency, having a magnetic-detector coil common thereto, the closed circuit having capacity and inductance, the inductance consisting of said coil.

5. In wireless telegraphy, a wave-frequency oscillatory receiving circuit including inductance and capacity adjustable for tuning the circuit, the inductance consisting of a magnetic-detector coil, and the resistance, inductance and capacity of said circuit being constant when the same is tuned.

6. In wireless telegraphy, a closed wave-frequency oscillatory receiving circuit including the coil of a magnetic-detector and capacity, said coil constituting the inductance for said circuit and the capacity being adjustable, and vertical and ground connections adjustably connected with the coil to adjust the inductance of the circuit, said adjustment being for tuning, the resistance, capacity and inductance when the circuit is tuned being constant.

7. In wireless telegraphy, two oscillatory circuits, one of which is open and the other closed and all wave-frequency, having a magnetic-detector coil common to both, and the inductance and capacity of both of which are adjustable.

In testimony whereof I have hereunto set my hand in presence of two subscribing witnesses.

WALTER W. MASSIE.

Witnesses:
HEATH SUTHERLAND,
BERNARD P. VASHON.